US011163128B2

(12) United States Patent
Hutchison et al.

(10) Patent No.: US 11,163,128 B2
(45) Date of Patent: Nov. 2, 2021

(54) ENCLOSURE FOR SPLICED CABLES FOR USE IN AN OUTDOOR ENVIRONMENT (71) Applicant: Special Product Company, Shawnee, KS (US)

(72) Inventors: Randall D. Hutchison, Shawnee, KS (US); Robert Schiffbauer, Olathe, KS (US); William Jerry Garrett, Jr., Olathe, KS (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 16/359,007

(22) Filed: Mar. 20, 2019

(65) Prior Publication Data
US 2020/0301088 A1 Sep. 24, 2020

(51) Int. Cl.
*G02B 6/00* (2006.01)
*G02B 6/44* (2006.01)

(52) U.S. Cl.
CPC ......... *G02B 6/4454* (2013.01); *G02B 6/4442* (2013.01); *G02B 6/4446* (2013.01)

(58) Field of Classification Search
CPC .. G02B 6/4452; G02B 6/3897; G02B 6/4446; G02B 6/4454; G02B 6/4442; G02B 6/00
See application file for complete search history.

(56) References Cited

U.S. PATENT DOCUMENTS

| 2,862,042 | A | | 11/1958 | Bollmeier | |
|---|---|---|---|---|---|
| 4,518,817 | A | * | 5/1985 | Kirby | H02G 9/10 |
| | | | | | 137/356 |
| 5,220,815 | A | | 6/1993 | Davidge et al. | |
| 6,363,200 | B1 | | 3/2002 | Thompson et al. | |
| 8,532,490 | B2 | * | 9/2013 | Smith | H04B 10/25754 |
| | | | | | 398/72 |

(Continued)

FOREIGN PATENT DOCUMENTS

WO    WO2018222740    12/2018

OTHER PUBLICATIONS

International Search Report dated Aug. 6, 2020 in corresponding PCT Application No. PCT/US20/23930, 4 pages.

(Continued)

*Primary Examiner* — Jennifer Doan
(74) *Attorney, Agent, or Firm* — MH2 Technology Law Group LLP (57) ABSTRACT A rugged information and communication system closure for outdoor installation and a method for assembling the same are provided. The closure includes an outer housing, a circuit device, a splice tray, a cable stub, and an epoxy filler. The outer housing includes a plurality of mounts configured to support the circuit device and the splice tray. The circuit device is mounted in the outer housing and includes internal circuitry, a first plurality of fibers connected to the internal circuitry, and a housing enclosing the internal circuitry. The splice tray is mounted over the circuit device and supports the first plurality of fibers. The cable stub extends through the outer housing and includes a second plurality of fibers spliced to the first plurality of fibers to form a splice. The splice is positioned on the splice tray. The epoxy filler occupies any remaining space of the outer housing to protect the circuit device and fibers from outside plant conditions.

28 Claims, 8 Drawing Sheets

(56) References Cited

U.S. PATENT DOCUMENTS

| | | |
|---|---|---|
| 10,001,608 B2 | 6/2018 | Gronvall et al. |
| 10,393,976 B2 * | 8/2019 | Islam .................. G02B 6/4471 |
| 2010/0183274 A1 | 7/2010 | Brunet et al. |
| 2015/0035734 A1 | 2/2015 | Lee et al. |
| 2018/0252887 A1 | 9/2018 | Coenegracht et al. |

OTHER PUBLICATIONS

Written Opinion dated Aug. 6, 2020 in corresponding PCT Application No. PCT/US20/23930, 14 pages.

* cited by examiner

ENCLOSURE FOR SPLICED CABLES FOR USE IN AN OUTDOOR ENVIRONMENT

BACKGROUND

An information and communication system often includes a signal processing device for various applications. The device often has to be stored in a hut or data center to protect the device from weather conditions and is often spliced to fibers stored in a closure or sealed cabinet, which has to be unsealed and opened. Installing the device in such a manner is often expensive and subject to strict time constraints that require the splicing to occur in a specific window of time. Further, the seals and gaskets of such closures or cabinets may be improperly replaced making the closures or cabinets susceptible to water infiltration.

The background discussion is intended to provide information related to the present invention which is not necessarily prior art.

SUMMARY

The present invention solves the above-described problems and other problems and provides a distinct advance in the art of information and communication systems. More particularly, the present invention provides an information and communication system closure that is weather-proof, versatile, and that reduces installation and maintenance time. The invention also provides a novel method of fabricating such an information and communication system closure.

A closure constructed in accordance with an embodiment of the present invention broadly includes an outer housing, a splice tray, a circuit device, a cable stub, and an epoxy filler. The outer housing includes a plurality of walls forming a chamber. The splice tray and circuit device are positioned inside the chamber of the outer housing. The circuit device includes internal circuitry, a housing enclosing the internal circuitry, and a first fiber connected to the internal circuitry. The cable stub extends through the outer housing and has a second fiber spliced to the first fiber. The splice of the first fiber and the second fiber are positioned on the splice tray.

The epoxy filler encapsulates the circuit device and the splice tray. The epoxy filler provides a seal over the circuit device and the splice tray thereby making it weather-proof and/or having an ingress protection 68 (IP68) rating so that it is submergible in water. By splicing the circuit device to the cable stub extending out of the closure, installation time is reduced because the cable stub can be connected to the information and communication system without in-field splicing.

Another embodiment of the invention is a method of assembling an information and communication system closure for outside plant use. The method broadly comprises positioning a circuit device in an outer housing; splicing a first fiber connected to the circuit device to a second fiber of a cable stub extending outside the outer housing; positioning a splice tray over the circuit device; and encapsulating the splice tray and the circuit device with an epoxy.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
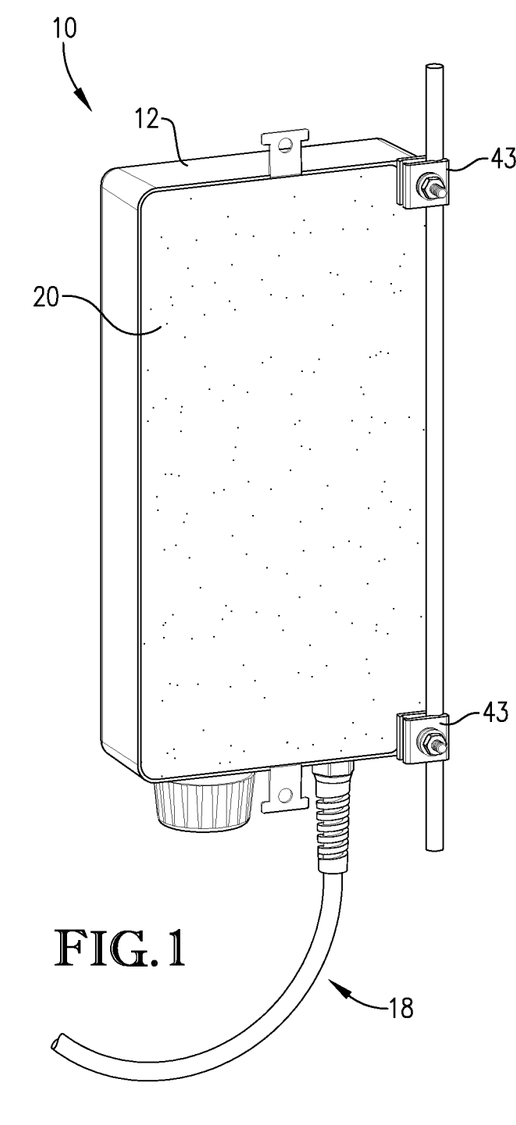
FIG. 1 is a rear perspective view of an exemplary information and communication system closure constructed in accordance with embodiments of the invention.
Figure 2:
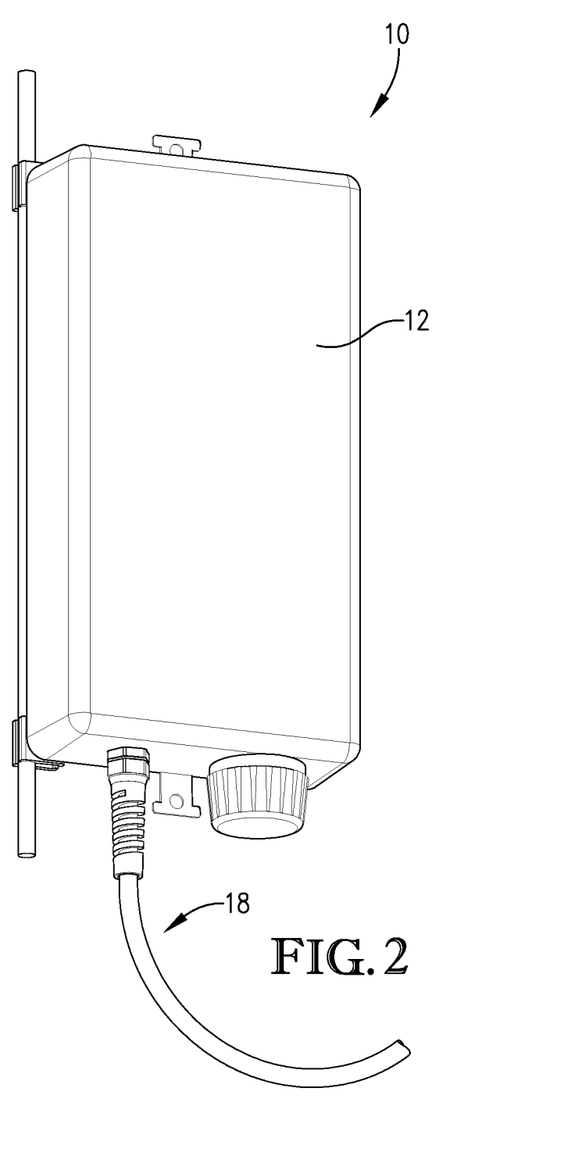
FIG. 2 is a front perspective view of the closure of FIG. 1.

Turning to FIGS. 1 and 2, an information and communication system closure 10 or enclosure 10 constructed in accordance with an embodiment of the invention is illustrated. The closure 10 may be installed for outdoor use as part of an information and communication network, including for a telecommunication system, a cable network, a transit system, etc. For example, the closure 10 may be stored on a telephone pole, in an underground chamber, strand-mounted on a communications line, etc. The telecommunication system may include a network of fiber optic cables, individual fibers, devices, etc. It may also include a network of electrical cables, electronic devices, antennas, transmitters, receivers, transceivers, etc.

Figure 3:
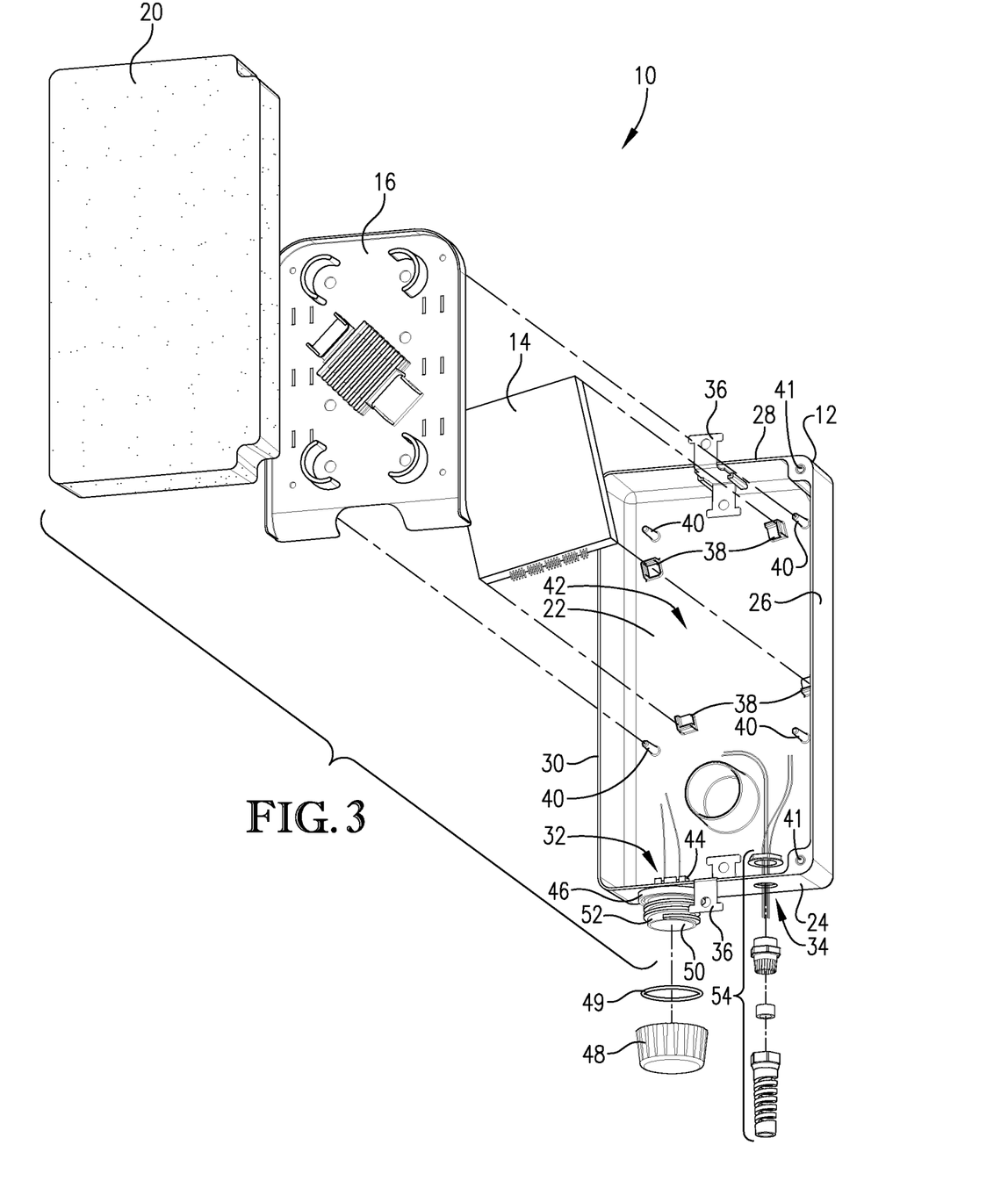
FIG. 3 is an exploded perspective view of the closure of FIG. 1.

The closure 10 or enclosure 10 broadly comprises an outer housing 12, a circuit device 14, a splice tray 16, a cable stub 18, and an epoxy filler 20, as shown in FIG. 3. The outer housing 12 protects and encloses the circuit device 14 and splice tray 16 and includes a mounting wall 22, a plurality of side walls 24, 26, 28, 30, a monitor port 32, a cable stub port 34, and mounting tabs 36. The mounting wall 22 may include device mounts 38 and tray mounts 40 for mounting the circuit device 14 and the splice tray 16, respectively. The device mounts 38 may form a rectangular or square outline configured to engage sides of the circuit device 14. The tray mounts 40 may be protrusions that extend from the mounting wall 22 a distance beyond the circuit device 14 so that the splice tray 16 can be mounted over the circuit device 14.

The side walls 24, 26, 28, 30 are attached to the mounting wall 22 to form a chamber 42 in which the circuit device 14 and the splice tray 16 are positioned. One or more of the side walls 24, 26, 28, 30 may include threaded inserts 41 configured to receive mounting brackets 43. The mounting brackets 43 (depicted in FIG. 1) may be configured to engage, for example, a communication line for mounting the closure 10 thereon.

The monitor port 32 is connected to one of the side walls 24 and provides access to signals of any fiber connected to the monitor port 32. The monitor port 32 may include an inner portion 44 located inside the chamber 42 and an outer portion 46 accessible from outside the closure 10. The inner portion 44 is configured to connect to one or more fiber so that the signal(s) of the one or more fiber is passed to anything connected to the outer portion 46. The monitor port 32 may also include a monitor port cap 48 configured to be secured to the monitor port 32. For example, the monitor port cap 48 may engage a portion of the outer portion 46, such as in a threaded engagement, a frictional engagement, or the like. The monitor port cap 48 may be configured to engage an inner surface 50 and/or an outer surface 52 of the outer portion 46. The monitor port cap 48 is configured to seal the monitor port 32. For example, the monitor port cap 48 may include an o-ring seal 49 positioned on the monitor port cap 48 that provides a weather-proof seal.

The cable stub port 34 may be positioned in one of the side walls 24 so that the cable stub 18 may enter the chamber 42 therethrough. A cable strain relief device 54 may be secured to the cable stub port 34 for protecting the cable stub 18 where it enters the cable stub port 34.

The mounting tabs 36 are attached to the outer housing 12 and have portions extending away from the outer housing 12 so that the housing 12 may be attached to another surface, such as a wall, a surface of a telephone pole, etc. The mounting tabs 36 may be have protrusions configured to engage one or more straps, including metallic straps such as BAND-IT® straps, for mounting the closure 10 to poles or other objects.

Figure 4:
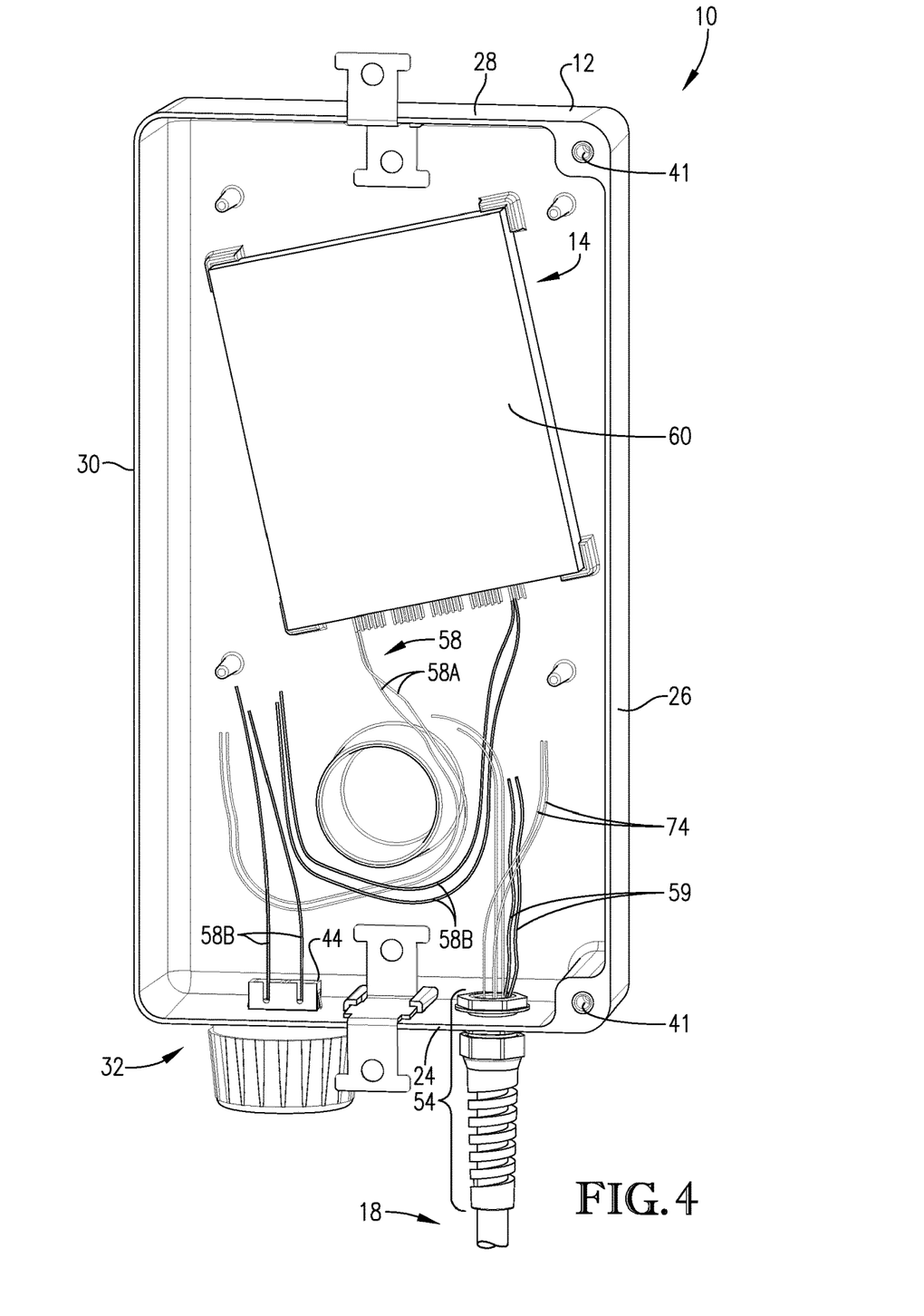
FIG. 4 is a perspective view of a circuit device of the closure of FIG. 1.
Figure 5:
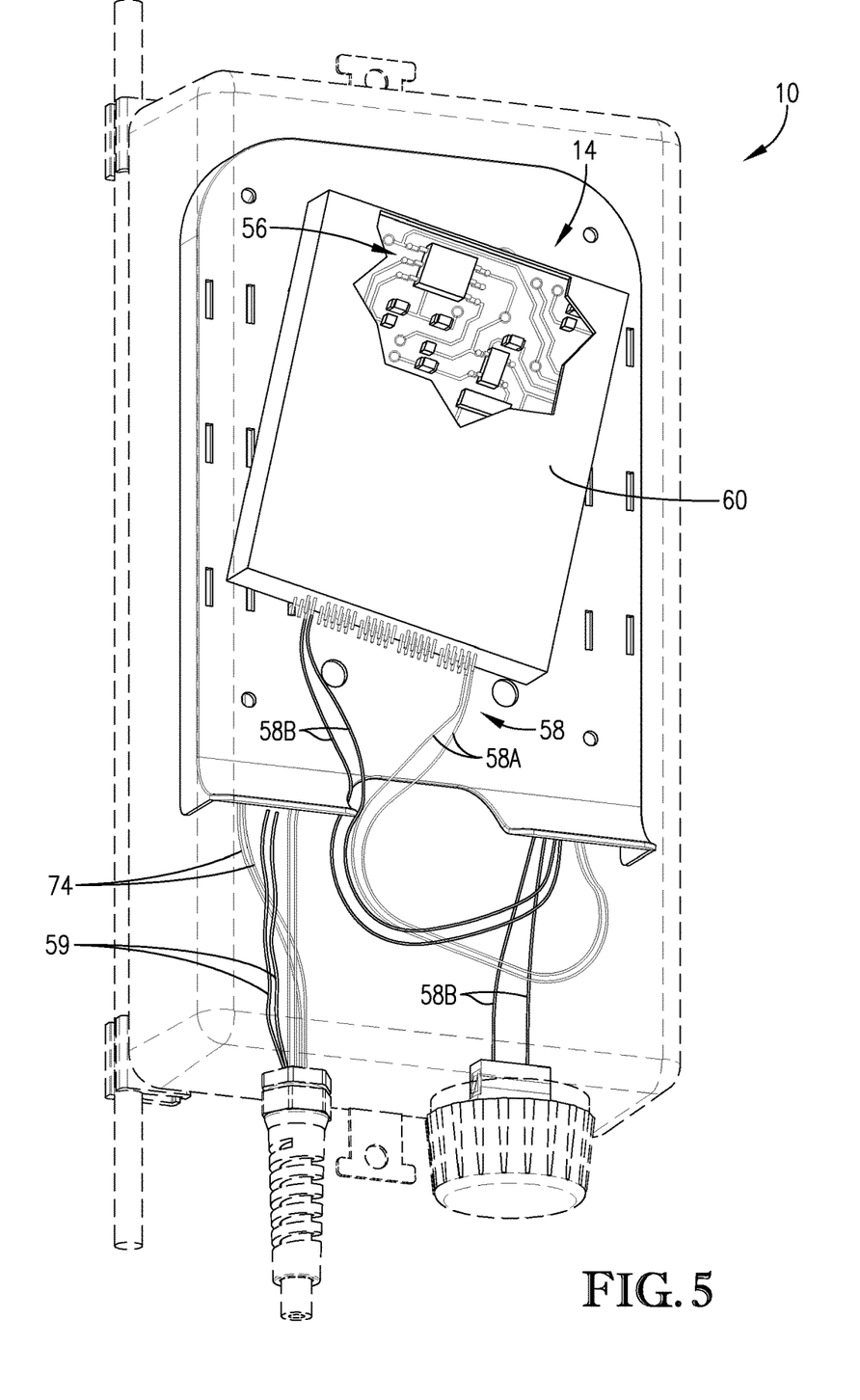
FIG. 5 is a front perspective view of the closure of FIG. 1.

Turning to FIGS. 4 and 5, the circuit device 14 is configured to perform signal processing and may include internal circuitry 56, a first plurality of fibers 58 connected to the circuitry 56, and a housing 60 that encloses the internal circuitry 56 and a portion of the fibers 58. The internal circuitry 56 may include a multiplexor circuit, a demultiplexor circuit, a filter circuit, a passive splitter circuit, an active splitter circuit, and/or any other passive and/or active circuitry or components. The internal circuitry 56 may receive and/or transmit signals via the plurality of fibers 58.

For example, the internal circuitry 56 may include a multiplexor/demultiplexor circuit that includes a plurality of upstream and/or downstream channels and upstream and/or downstream monitor channels. Each channel may be connected to a corresponding, color-coded channel fiber 58A. Additionally, the downstream and upstream monitor channels may be transmitted via upstream and downstream fibers 58B that connect to the monitor port 32 so that the downstream and upstream monitor channels' signals can be accessed outside the closure 10.

The internal circuitry 56 may also be connected to one or more wires 59 extending through the cable stub port 34. The wires 59 may be connected to a power source (not shown) so that power may be provided to the circuit device 14 if its internal circuitry 56 includes active circuitry. Additionally or alternatively, the wires 59 may be connected to a power port (not shown) that is attached to the outer housing 12 and is connectable to an external cable (not shown) that is connected to the power source.

The housing 60 of the circuit device 14 is positioned on the device mounts 38 so that the plurality of fibers 58 extends from the housing 60 and are positioned on the splice stray 16. The plurality of fibers 58 have spliced ends positioned in splice tubes 62, which may also be positioned on the splice tray 16, as shown in FIG. 6.

Figure 6:
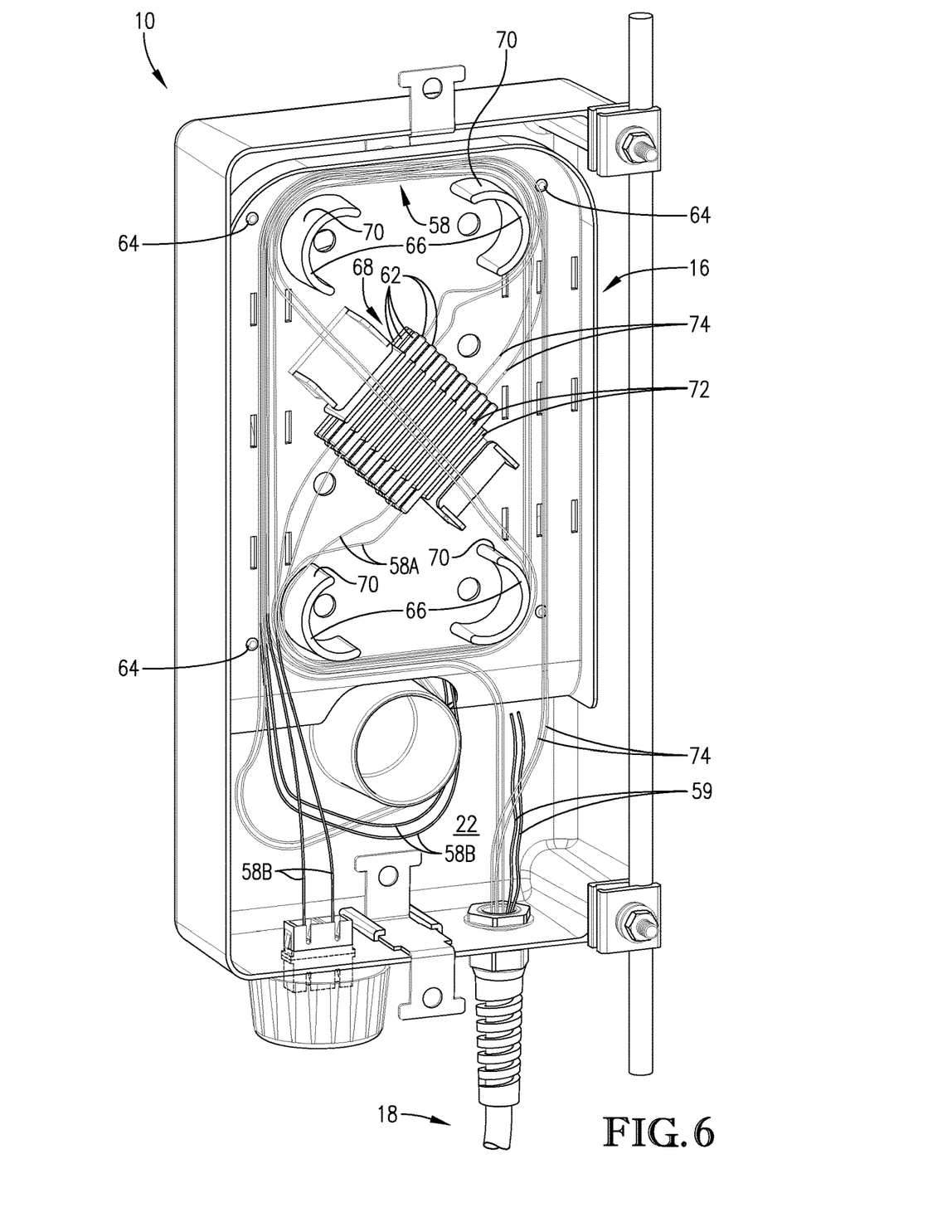
FIG. 6 is a perspective view of a splice tray positioned in the closure of FIG. 1.

Turning to FIG. 6, the splice tray 16 supports the first plurality of fibers 58 and splice tubes 62. The splice tray 16 may also support the one or more power wires 59. The splice tray 16 may be mounted on the mounting wall 22 via the tray mounts 40 and over the circuit device 14 so that the circuit device 14 is positioned between the splice tray 16 and the mounting wall 22. The splice tray 16 may include one or more coupling mechanisms 64 that secure the splice tray 16 to the tray mounts 40. For example, the coupling mechanism 64 may include an opening having a biasing portion that engages the tray mounts 40 or a fastener that engages a threaded portion of the tray mounts 40. The splice tray 16 includes one or more fiber wraps 66 and one or more splice storage shelves 68.

The fiber wraps 66 include one or more surfaces 70 around which the plurality of fibers 58 is wound. For example, one or more of the fibers 58 may be connected to the upstream monitor channel and the downstream monitor channel and wound around the fiber wraps 66 before connecting to the monitor port 32.

The splice storage shelves 68 secure the splice tubes 62 to the splice tray 16 and may include two or more flanges 72 that sandwich one or more splice tubes 62 therebetween. The two or more flanges 72 may have a height sufficient to allow multiple splice tubes 62 to be sandwiched between two flanges 72. The splice storage shelves 68 may be centered on the splice tray 16 to efficiently use the space in the chamber 42.

Figure 7:
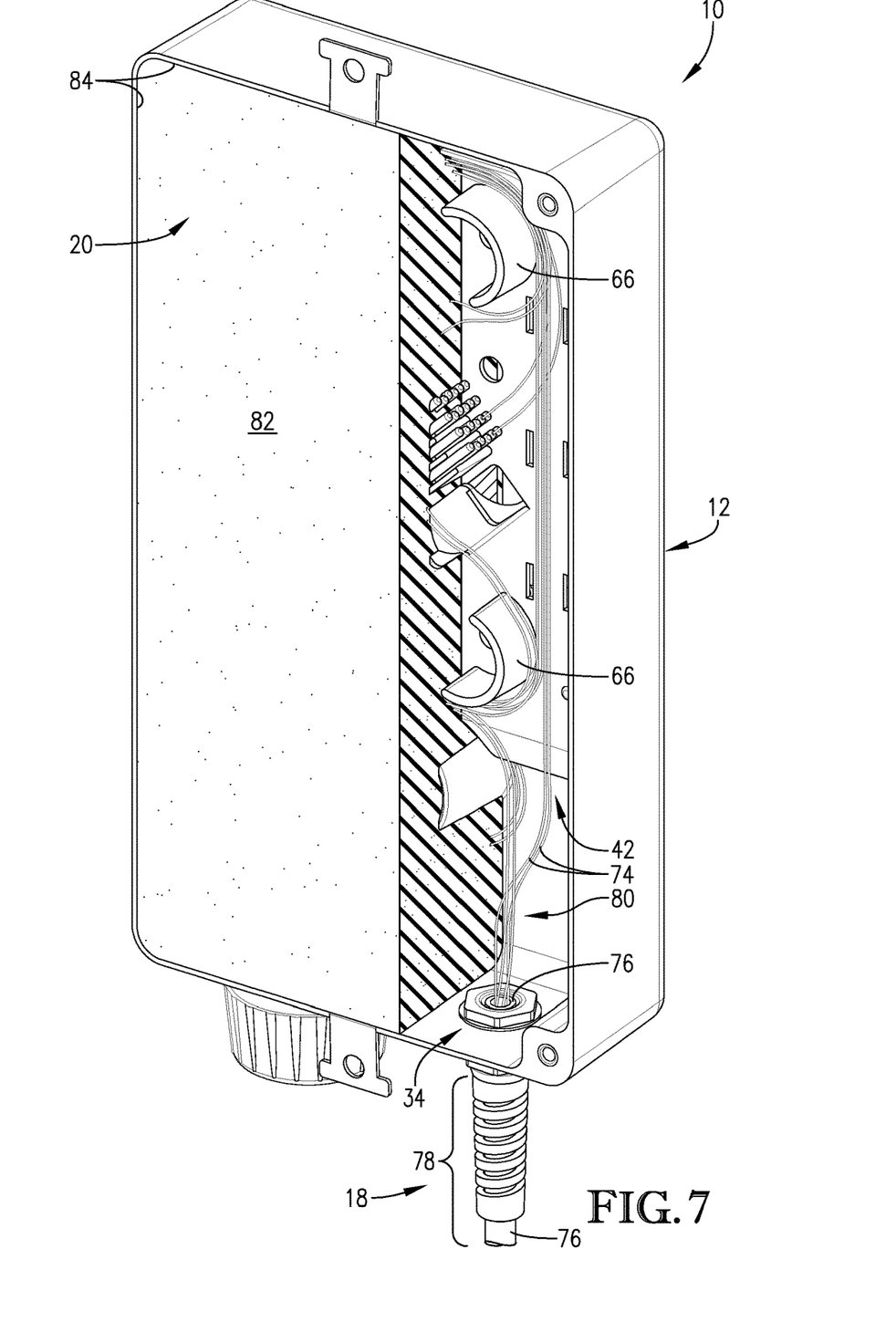
FIG. 7 is a perspective view of the closure of FIG. 1 with a portion of an epoxy filler removed.

Turning to FIG. 7, the cable stub 18 enables connection to the circuit device 14 outside the outer housing 12 and includes a second plurality of fibers 74 surrounded by a jacket 76. The cable stub 18 includes a length 78 positioned outside the outer housing 12 connectable to the information and communication system. The cable stub 18 may be any length, and the length 78 positioned outside the outer housing 12 may also be of any length. The cable stub 18 enters the chamber 42 of the outer housing 12 via the cable stub port 34. The jacket 76 may be removed on a portion of the cable stub 18 positioned inside the chamber 42 so that exposed lengths 80 of the second plurality of fibers 74 are positioned inside the chamber 42. The lengths 80 may be wrapped around the fiber wraps 66 and spliced to the first plurality of fibers 58. The splice tubes 62 that support the spliced fibers 58, 74 are stored on the splice storage shelves 68. The lengths 80 may be color-coded to correspond with the color-coded first plurality of fibers 58 and may be spliced to corresponding first plurality of fibers 58 via their corresponding splice tubes 62. This enables the circuit device 14 to be installed in an information and communication system via the cable stub 18 without expensive labor performing in-field splicing of the fibers 58, 74. It is foreseen that the plurality of fibers 58, 74 may be matched through additional or alternative means besides color-coding without departing from the scope of the present invention. Additionally, the closure 10 may include any number of cable stubs 18 without departing from the scope of the present invention. For example, the closure 10 may include an input cable stub and an output cable stub.

The epoxy filler 20 protects the circuit device 14, the splice tubes 62, and the fibers 58, 74 from the elements. The epoxy filler 20 may encapsulate the circuit device 14, the splice tray 16, the splice tubes 62, the fibers 58, 74, and/or any other component positioned inside the chamber 42. The epoxy filler 20 may fill the entirety of the remaining space inside the chamber 42 so that a top surface 82 of the epoxy filler 20 is substantially flush with edges 84 of the side walls 24, 26, 28, 30. The epoxy filler 20 may be a two-part epoxy and include plastic, resin, adhesives, polymers, etc.

Figure 8:
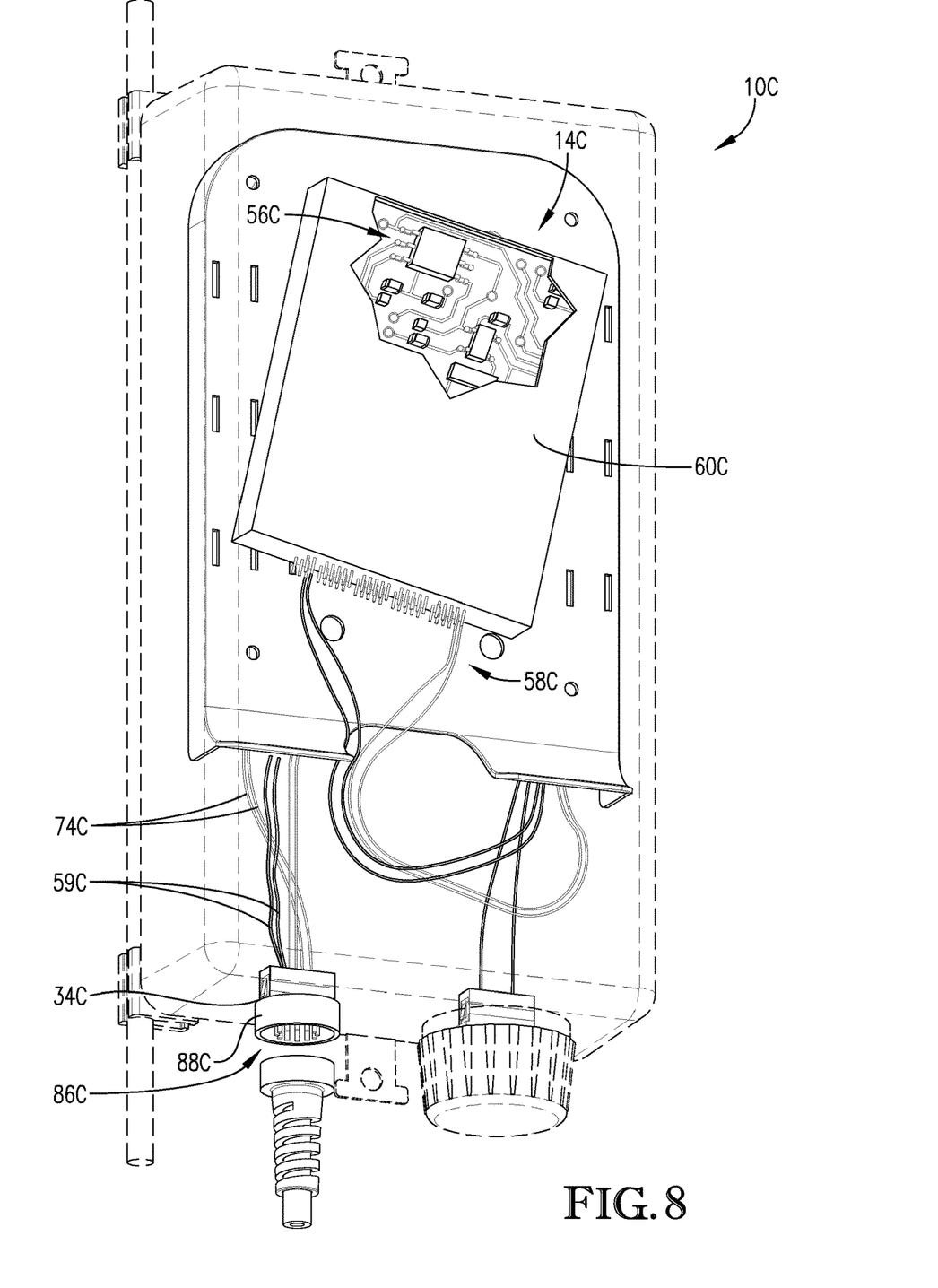
FIG. 8 is a front perspective view of a closure constructed in accordance with another embodiment of the invention.

Turning to FIG. 8, a closure 10C constructed in accordance with another embodiment of the present invention is depicted. The closure 10C may comprise substantially similar components as closure 10; thus, the components of closure 10C that correspond to similar components in closure 10 have a 'C' appended to their reference numerals.

The closure 10C includes all the features of closure 10 except that instead of including a cable stub extending into the outer housing 12C, the closure 10C includes a cable stub connector 86C. The cable stub connector 86C is positioned in the cable stub port 34C and is connected to a plurality of internal fibers 74C which are spliced to the fibers 58C of the circuit device 14C. The cable stub connector 86C includes a portion 88C accessible from outside the outer housing 12C that is configured to connect to fibers of a cable stub 18C. The cable stub connector 86C may be sealed so that water is not able to enter the outer housing 12C through the cable stub connector 86C or the cable stub port 34C. It is foreseen that the closure 10A may include any number of cable stub connectors 86C without departing from the scope of the present invention.

Figure 9:
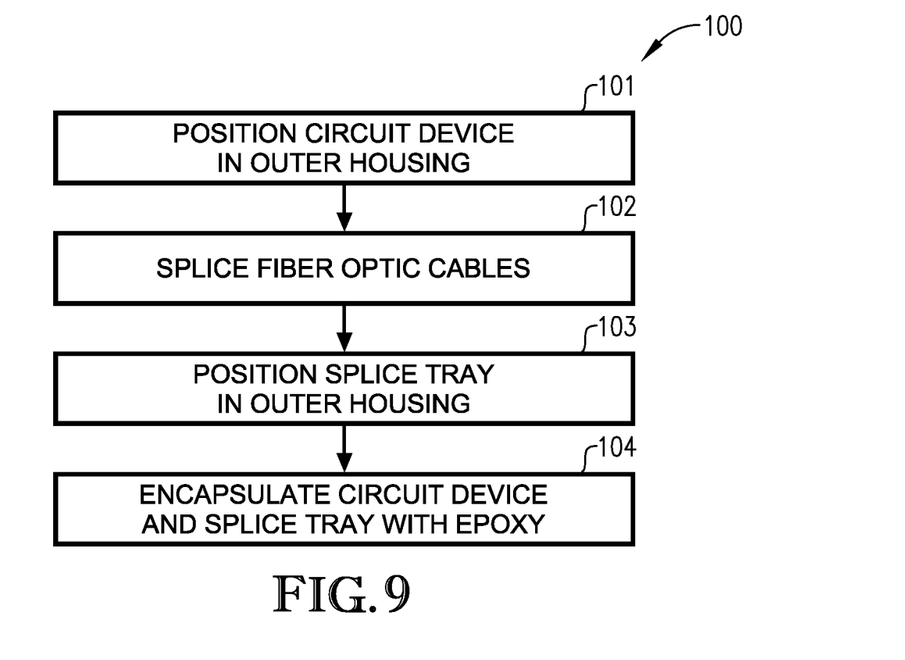
FIG. 9 is a flowchart illustrating a method for assembling an information and communication system closure according to embodiments of the present invention.

The flow chart of FIG. 9 depicts the steps of an exemplary method 100 of assembling a closure for installation in an information and communication system. In some alternative implementations, the functions noted in the various blocks may occur out of the order depicted in FIG. 9. For example, two blocks shown in succession in FIG. 9 may in fact be executed substantially concurrently, or the blocks may sometimes be executed in the reverse order depending upon the functionality involved. In addition, some steps may be optional.

Referring to step 101, the circuit device 14 may be positioned in the outer housing 12. The circuit device 14 may be supported on the device mounts 38 of the mounting wall 22 of the outer housing 12, and the first plurality of fibers 58 extending from the circuit device 14 may be wrapped around the fiber wraps 66 of the splice tray 16.

Referring to step 102, a portion of the plurality of fibers 58 may be spliced to the second fiber 74 of the cable stub 18 extending outside the outer housing 12. Splice tubes 62 may be used to support the splices of the fibers 58, 74. The plurality of fibers 58, 74 may be spliced before or after being wrapped around the fiber wraps 66. The fibers 58, 74 may be spliced via mechanical or fusion splicing. This step may also include connecting one or more of the first plurality of fibers 58 to the monitor port 32.

Referring to step 103, the splice tray 16 may be positioned over the circuit device 14. The splice tray 16 may be positioned in the chamber 42 of the outer housing 12 and secured to the tray mounts 40 on the mounting wall 22 so that the circuit device 14 is sandwiched between the mounting wall 22 and the splice tray 16. The splice tray 16 may be secured to the tray mounts via the coupling mechanisms 64.

Referring to step 104, the circuit device 14 and the splice tray 16 may be encapsulated by the epoxy filler 20. The epoxy filler 20 may encapsulate the circuit device 14 and the splice tray 16 by being poured into the chamber 42 while in a liquid state so that the epoxy filler 20 fills any available space in the chamber 42.

The method 100 may include additional, less, or alternate steps and/or device(s), including those discussed elsewhere herein.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An enclosure for spliced cables to protect the spliced cables from outdoor weather, the enclosure comprising:
   an outer housing;
   a splice tray positioned inside the outer housing;
   a circuit device positioned inside the outer housing and including internal circuitry;
   a first fiber connected the internal circuitry;
   a cable stub extending through the outer housing and having a second fiber spliced to the first fiber to form a splice;
   wherein the splice is configured to be disposed within a splice tube that is positioned in a channel so as to protect and support the splice;
   wherein the channel is defined by a storage shelf and the splice tray;
   wherein the storage shelf comprises a first storage shelf and a second storage shelf; and
   wherein the storage shelf is configured to be co-extensive with the splice tube along a length of the splice tube so as to secure the splice tube along the length of the splice tube.

2. The enclosure of claim 1, wherein the storage shelf comprises a plurality of storage shelves.

3. The enclosure of claim 2, wherein the internal circuitry includes at least one of a multiplexor or a demultiplexor circuit.

4. The enclosure of claim 1, wherein the circuit device includes a downstream monitor channel fiber, an upstream monitor channel fiber, a downstream channel fiber, and an upstream channel fiber.

5. The enclosure of claim 4, further comprising a monitor port configured to be attached to the outer housing, wherein the downstream monitor channel fiber is configured to be connected to the monitor port, and wherein the upstream monitor channel fiber is configured to be connected to the monitor port.

6. The enclosure of claim 5, further comprising a mounting port cap configured to be secured to the monitor port.

7. The enclosure of claim 4, wherein the splice tray includes a splice storage shelf that holds the splice.

8. The enclosure of claim 4, wherein the splice tray includes a fiber wrap, and wherein the first fiber and the second fiber are configured to be wound around the fiber wrap.

9. The enclosure of claim 1, wherein the outer housing includes a plurality of walls that are configured to form a chamber.

10. The enclosure of claim 9, wherein the circuit device and the splice tray are configured to be positioned in the chamber, and further comprising an epoxy filler that is configured to occupy remaining space in the chamber.

11. The enclosure of claim 1, further comprising a mounting tab that is configured to be attached to the outer housing.

12. The enclosure of claim 1, wherein the internal circuitry includes at least one of a passive splitter circuit, an active splitter circuit, or a filter.

13. The enclosure of claim 1, wherein the splice tube and the channel are configured to support the splice.

14. An enclosure spliced cables in an outdoor installation, the enclosure comprising:
   a mounting wall;
   a side wall attached to the mounting wall and configured to define a chamber, the side wall including a monitor port having a portion accessible outside the chamber;
   a splice tray configured to be positioned in the chamber and secured to the mounting wall, the splice tray having a splice tube that is positioned in a channel defined by a storage shelf and the splice tray so as to protect and support a splice;
   an external fiber configured to extend through the side wall and having an end portion positioned on the splice tray;
   an internal fiber configured to be spliced to the external fiber;
   a monitor cable configured to be connected to the monitor port;
   internal circuitry configured to be connected to the internal fiber and the monitor cable;
   wherein the storage shelf is configured to be co-extensive with the splice tube along a length of the splice tube so as to secure the splice tube along the length of the splice tube.

15. The enclosure of claim 14 wherein the storage shelf further includes a first storage shelf and a second storage shelf; and
   wherein the storage shelf is configured to be co-extensive with the splice tube along a length of the splice tube so as to secure the splice tube along the length of the splice tube.

16. The enclosure of claim 14, wherein the external fiber comprises a plurality of external fibers, the internal fiber comprises a plurality of internal fibers, and the monitor cable comprises a plurality of monitor fibers.

17. The enclosure of claim 14 further comprising a housing configured to be positioned in the chamber between the splice tray and the mounting wall wherein the housing is configured to enclose the internal circuitry.

18. The enclosure of claim 14, further comprising:
   a monitor port cap configured to attach to an outer portion of the monitor port; and
   an epoxy filler that is configured to encapsulate the housing and the splice tray.

19. The enclosure of claim 14, wherein the internal circuitry is configured to multiplex and de-multiplex signals received via the plurality of internal fibers.

20. An enclosure for spliced cables in an outdoor installation, the enclosure comprising:
   an outer housing;
   a splice tray configured to be positioned inside the outer housing;
   a circuit device configured to be positioned inside the outer housing and include internal circuitry;
   a first fiber configured to be connected to the internal circuitry;
   a cable stub configured to extend through the outer housing and have a second fiber spliced to the first fiber to form a splice so as to connect the first fiber to the second fiber;
   wherein the splice is configured to be positioned on the splice tray so as to protect and support the splice; and
   wherein the circuit device includes a downstream monitor channel fiber, an upstream monitor channel fiber, a downstream channel fiber, and an upstream channel fiber.

21. The enclosure of claim 20, further comprising:
   a housing configured to enclose the internal circuitry; and
   an epoxy filler configured to encapsulate the circuit device and the splice tray.

22. The enclosure of claim 20, wherein the internal circuitry includes a multiplexor circuit and a demultiplexor circuit.

23. The enclosure of claim 20, wherein the outer housing includes a wall structure that is are configured to form a chamber.

24. The enclosure of claim 20, wherein the wall structure comprises a plurality of walls.

25. The enclosure of claim 20, further comprising a mounting tab configured to be attached to the outer housing.

26. The enclosure of claim 20, wherein the internal circuitry includes at least one of a passive splitter circuit, an active splitter circuit, or a filter.

27. The enclosure of claim 20, further comprising a splice tube and a channel that is configured to support the splice.

28. The enclosure of claim 1, further comprising:
   a housing configured to enclose the internal circuitry; and
   an epoxy filler configured to encapsulate the circuit device and the splice tray.

* * * * *